United States Patent [19]
Kawakami et al.

[11] Patent Number: 6,063,142
[45] Date of Patent: *May 16, 2000

[54] PROCESS FOR PRODUCING A RECHARGEABLE LITHIUM BATTERY HAVING AN IMPROVED ANODE COATED BY A FILM CONTAINING A SPECIFIC METAL OXIDE MATERIAL

[75] Inventors: Soichiro Kawakami, Nara; Shinya Mishina, Kawasaki; Naoya Kobayashi, Nara; Masaya Asao, Kyoto, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/563,959

[22] Filed: Nov. 29, 1995

[30] Foreign Application Priority Data

Dec. 1, 1994 [JP] Japan ................................. 6-298135
Nov. 17, 1995 [JP] Japan ................................. 7-300335

[51] Int. Cl.⁷ ............................. H01M 4/48; B05D 5/12
[52] U.S. Cl. ............... 29/623.5; 427/126.3; 427/126.4; 427/126.5; 427/126.6; 429/218.1
[58] Field of Search ............................. 429/218, 212, 429/209, 218.1; 29/623.5; 427/126.4, 126.5, 126.3, 126.6

[56] References Cited

U.S. PATENT DOCUMENTS

| | | | |
|---|---|---|---|
| 5,147,739 | 9/1992 | Beard | 429/194 |
| 5,284,721 | 2/1994 | Beard | 429/194 |
| 5,478,671 | 12/1995 | Idota . | |
| 5,672,444 | 9/1997 | Kuriyaki et al. . | |
| 5,807,411 | 9/1998 | Kuriyaki et al. . | |

FOREIGN PATENT DOCUMENTS

| | | | |
|---|---|---|---|
| 0350066 | 1/1990 | European Pat. Off. . | |
| 0517070 | 12/1992 | European Pat. Off. . | |
| 0567149 | 10/1993 | European Pat. Off. . | |
| 0600718 | 6/1994 | European Pat. Off. . | |
| 61-263069 | 11/1986 | Japan . | |
| 63-13264 | 1/1988 | Japan | H01M 4/40 |
| 63-114057 | 5/1988 | Japan | H01M 4/02 |
| 63-289759 | 11/1988 | Japan . | |
| 2-082447 | 3/1990 | Japan . | |
| 2-82447 | 3/1990 | Japan . | |
| 4-324258 | 11/1992 | Japan . | |
| 5-47381 | 2/1993 | Japan | H01M 4/40 |
| 5190171 | 7/1993 | Japan | H01M 4/02 |
| 5-234585 | 9/1993 | Japan . | |
| 5234585 | 9/1993 | Japan | H01M 4/02 |
| 6-283157 | 10/1994 | Japan . | |
| 6283157 | 10/1994 | Japan | H01M 4/02 |

OTHER PUBLICATIONS

Patent Abstracts of Japan, vol. 13, No. 117, (E–731), Mar. 22, 1989.
Patent Abstracts of Japan, vol. 14, No. 263 (E–0938), Jun. 7, 1990.
J. Solid State Chem., vol. 96, No. 1, Jan. 1, 1992, pp. 13–19.
Chem. Abstracts, vol. 106, No. 24, Jun. 5, 1987, abstract No. 199239.
Chem. Abstracts, vol. 113, No. 6, Aug. 6, 1990, abstract No. 43882h.
Chem. Abstracts, vol. 116, No. 12, Mar. 23, 1992, abstract No. 119598.
Chem. Abstracts, vol. 118, No. 18, May 3, 1993, abstract No. 172582.
Journal of Applied Electrochemistry, N. Kumagai, et al., vol. 22, pp. 620–627, "Cycling Behaviour of Lithium–Aluminium Alloys Formed on Various Aluminium Substrates as Negative Electrodes in Secondary Lithium Cells", Jun., 1991.
Chemical Abstracts of Japan, Aug. 6, No. 6, "Manufacture of Secondary Lithium Batteries", 1990.
Jundo Oi et al., Journal of Solid State Chemistry, "Hexagonal Tungsten Trioxide Obtained from Peroxo–polytungstate and Reversible Lithium Electro–intercalation into its Framework", vol. 96, No. 1, Jan. 1992.

*Primary Examiner*—John S. Maples
*Attorney, Agent, or Firm*—Fitzpatrick, Cella, Harper & Scinto

[57] ABSTRACT

An anode for a rechargeable lithium battery which comprises an anode substrate and a coat disposed so as to cover at least a surface of said anode substrate opposed to said cathode, said coat comprising a film comprised of a metal oxide material of 1.5 or less in standard electrode potential difference with respect to lithium and capable of intercalating or deintercalating lithium ions generated during battery reaction. A process for producing said anode, characterized in that said film is formed using a polyacid or a peroxo polyacid. A rechargeable lithium battery is provided with said anode.

20 Claims, 4 Drawing Sheets

PROCESS FOR PRODUCING A RECHARGEABLE LITHIUM BATTERY HAVING AN IMPROVED ANODE COATED BY A FILM CONTAINING A SPECIFIC METAL OXIDE MATERIAL

BACKGROUND OF THE INVENTION

1. Field of the Invention

The present invention relates to a rechargeable lithium battery having an improved anode with a coat comprising a film comprised of a specific metal oxide material having a specific standard electrode potential difference or electromotive force with respect to lithium and capable of intercalating or deintercalating lithium ions generated during battery reaction and which stably exhibits an excellent battery performance while depositing lithium such that granules of lithium are uniformly and substantially two-dimensionally grown in said coat or at interfaces of said coat without the generation of a dendrite (or a branched tree-like protrusion) of lithium upon operating charging and has a prolonged charging and discharging cycle life. The present invention also relates to a process for producing said anode and said rechargeable lithium battery.

2. Related Background Art

In recent years, heating of the earth because of the so-called greenhouse effect due to an increase of atmospheric $CO_2$ has been predicted.

In the case of the steam-power generation, the amount of fossil fuel, represented by coal or petroleum, consumed for power generation in order to comply with a societal demand for increased power supply has been continuously increasing. Along with this, the amount of exhaust fumes from the steam-power generation plants has been continuously increasing, and accordingly the content of gases, such as carbon dioxide, has risen to cause a greenhouse effect. This results in providing an earth-warming phenomenon. In order to prevent said earth-warming phenomenon from further developing, there is a tendency of prohibiting the establishment of new steam-power generation plants in some countries.

Under these circumstance, there has been made proposed the conducting of so-called load leveling in order to effectively utilize the power generator, wherein rechargeable batteries are installed at general houses and surplus power unused in the night, that is, a so-called dump power, is stored in said rechargeable batteries. The power thus stored is supplied in the daytime when the power demand is increased, whereby the power generator is leveled in terms of the load therefor.

In recent years, there has been the development of electric vehicles which do not exhaust any air polluting substances are of low impact to the environment, and which are expected to replace gasoline-fueled vehicles and diesel-fueled vehicles. For such an electric vehicle, there is an increased demand for developing a high performance rechargeable battery with a high energy density which can be effectively used therein.

Other than this, there is an increased demand for developing a miniature, lightweight, high performance rechargeable battery usable as a power source for portable instruments such as small personal computers, word processors, video cameras, and pocket telephones.

Further, there is an increased demand for realizing a high performance rechargeable battery capable of attaining load leveling not only for power generated by solar cells but also for power generated by an aerogenerator or a wave activated power generator. The dump power can be stored in the rechargeable battery and the power thus stored can be supplied upon demand.

As such a rechargeable battery, there has been proposed various rocking chair type lithium ion batteries. In these batteries, a carbon material, such as graphite which is capable of intercalating lithium ions at an intercalation of its six-membered network plane provided by carbon atoms in the battery reaction upon charging is used as an anode material and a lithium intercalation compound capable of deintercalating said lithium ions from the intercalation in the battery reaction upon charging is used as a cathode material. Some of these batteries have been used practically. However, in any of these lithium ion batteries, the theoretical amount of lithium which can be intercalated by the anodes is only an amount of ⅙ per carbon atom. If it is desired to increase the amount of lithium intercalated by the anode above the theoretical amount, unavoidable problems will occur because lithium is often deposited in a dendritic state (that is, in the form of a dendrite) on the anode during the charging operation. Formation of lithium dendrites will cause internal-shorts between the anode and the cathode upon repeating the charging and discharging cycle, and a battery possessing a sufficient charging and discharging cycle life cannot be obtained.

Therefore, based on the constitution of the foregoing lithium ion battery, a desirable rechargeable battery having an electric capacity and energy density similar to those in a primary battery, in which a lithium metal is used as the anode cannot be realized.

There has been proposed a rechargeable lithium battery in which metallic lithium is used as the anode. However, such a rechargeable lithium battery has not yet been realized as practically usable because its charging and discharging cycle life is extremely short. A main reason for this short cycle life has been generally attributable to reactions of metallic lithium with impurities such as water or an organic solvent contained in an electrolyte solution, form an insulating film. The formation of the insulating film promoted the formation of a dendrite by metallic lithium during the charging operation, resulting in internal-shorts between the anode and cathode upon repeating the charging and discharging cycle. As a result, the charging and discharging cycle life of the rechargeable lithium battery is dramatically shortened.

Now, as above described, once the lithium dendrite is formed, the dendrite is liable to gradually grow upon the charging operation, resulting in causing internal-shorts between the anode and the cathode. When the anode is internally shorted with the cathode, the energy possessed by the battery is rapidly consumed at the internally shorted portion which causes additional problems e.g., the battery is heated or the solvent of the electrolyte is decomposed by virtue of heat to generate gas, resulting in raising the inner pressure of the battery. These problems result in damaging the rechargeable battery or/and shortening the lifetime of the battery.

There has been proposed a manner of using a lithium alloy such as lithium-aluminum alloy as the anode for a rechargeable lithium battery in order to suppress the reactivity of the lithium with water or an organic solvent contained in the electrolyte solution so that lithium dendrite formation is suppressed. However, this manner is not practical because the lithium alloy is difficult to shape into a spiral form and therefore, it is difficult to produce a spiral-wound cylindrical rechargeable battery; a desirable charging and discharging cycle life for a rechargeable battery cannot be obtained; and for a rechargeable battery that is obtained, a desirable energy density similar to that of a primary battery in which a metallic lithium is used as the anode cannot be realized.

By the way, Japanese Unexamined Patent Publication No. 13264/1988 (hereinafter referred to as document 1), No. 47381/1993 (hereinafter referred to as document 2) or No. 190171/1993 (hereinafter referred to as document 3) discloses a non-aqueous series rechargeable battery in which the anode is composed of a lithium alloy. Document 3 discloses a non-aqueous series battery directed to improving the cycle life and also in the cycle characteristics after battery storage. In this battery, the anode is composed of a material comprising an aluminum-manganese combined with a metal which is more electrochemically noble than aluminum such as vanadium, chromium, or titanium, and lithium as the anode active material. The active site of the alloy with lithium is increased to prevent localization of the reaction.

Further, Japanese Unexamined Patent Publication No. 114057/1988 (hereinafter referred to as document 4) discloses a non-aqueous series rechargeable battery aiming at an improvement in the charging and discharging characteristics. The anode of this battery is composed of a basic constituent comprising a sintered body of a mixture composed of fibrous aluminum and fibrous metal incapable of being alloyed with lithium and a negative material comprising a lithium-aluminum alloy.

In addition, Japanese Unexamined Patent Publication No. 234585/1993 (hereinafter referred to as document 5) discloses a non-aqueous series rechargeable battery directed to minimizing the generation of a dendrite so that the charging efficiency is improved and the battery cycle life is prolonged. In this battery, the anode is composed of lithium metal, having powdery metal (which hardly forms an intermetallic compound with said lithium metal) uniformly deposited on the surface thereof.

However, any of the rechargeable batteries disclosed in the above documents 1 to 5 is still problematic because as the charging and discharging are alternately repeated over a long period of time, the anode is repeatedly expanded and shrunk and become damaged by loss of the constituents or by formation of a crack. The generation or growth of a dendrite cannot be sufficiently prevented and the rechargeable battery eventually shows poor current collecting performance.

Other than the above-mentioned documents, *Journal of Applied Electrochemistry*, 22, 620–627 (1992) (hereinafter referred to as document 6) discloses a rechargeable lithium battery in which the anode is constituted by an aluminum foil having a surface applied with etching treatment. However, the rechargeable lithium battery disclosed in the document 6 is also problematic. When the charging and discharging cycle is repeated for as many times as practically conducted for the ordinary rechargeable battery, problems are liable to occur, such that when the charging and discharging are alternately repeated, the aluminum foil is repeatedly expanded and shrunk and becomes damaged by a crack, resulting in causing a reduction in the current collecting performance. The growth of a dendrite is also liable to occur.

Hence, any of the rechargeable batteries disclosed in the documents 1 to 6 is still accompanied by some problems that remain to be solved.

Accordingly, there is an increased demand for the provision of an improved, highly reliable rechargeable lithium battery which is high in energy density (or charge energy density) and long in charging and discharging cycle life.

Aiming at eliminating the problems found in the conventional rechargeable lithium batteries, three of the four present inventors of the present invention together with another person have proposed a rechargeable lithium battery having an anode coated by an inorganic oxide film capable of allowing lithium ions generated during a battery reaction to pass through, in which the generation or growth of a dendrite of lithium is prevented, and this rechargeable lithium battery has an improved charging and discharging cycle life (see, Japanese Unexamined Patent Publication No. 283157/1994).

SUMMARY OF THE INVENTION

The present inventors, have made experimental studies in order to improve the battery characteristics of the rechargeable lithium battery proposed by Japanese Unexamined Patent Publication No. 283157/1994 through experiments. As a result, it was found that the rechargeable lithium battery still presents problems that must be solved such that it is difficult to attain a sufficient service capacity at the time of charging with a large quantity of an electric current, namely upon charging at a high speed. It is difficult to always attain a sufficiently prolonged charging and discharging cycle life, and therefore, rechargeable lithium batteries are still inadequate in terms of quick charging characteristics, energy density, and charging and discharging cycle life.

A principal object of the present invention is therefore to eliminate the problems found in the above rechargeable lithium battery.

Another object of the present invention is to provide an improved rechargeable lithium battery which excels in quick charging characteristics, energy density, and charging and discharging cycle life.

A further object of the present invention is provide a highly reliable, high performance rechargeable lithium battery which provides a sufficient service capacity without causing the generation or growth of a dendrite of lithium, even upon rapid charging. This battery will always exhibit an excellent battery performance and has a prolonged charging and discharging cycle life.

A further object of the present invention is to provide a highly reliable, high performance rechargeable lithium battery provided with an improved anode comprising (a) an anode substrate containing at least an electrically conductive material, which is covered by (b) a coat comprising a specific metal oxide material of 1.5 V or less, or preferably, 1.0 V or less in standard electrode potential difference or electromotive force with respect to lithium and capable of intercalating or deintercalating lithium ions generated during battery reaction in which lithium is deposited upon charging such that granules of lithium are uniformly and substantially two-dimensionally grown in said coat or at interfaces of said coat without the generation of a dendrite of lithium, said rechargeable lithium battery exhibiting an excellent battery performance while maintaining a high battery voltage and without causing internal-shorts between the anode and cathode and having high energy density and long charging and discharging cycle life.

A further object of the present invention is to provide a highly reliable, high performance rechargeable lithium battery provided with an improved anode comprising (a) an anode substrate containing at least an electrically conductive material which is covered by (b) a coat comprising a specific metal oxide material of 1.5 V or less, or preferably, 1.0 V or less in standard electrode potential difference or electromotive force with respect to lithium and capable of intercalating or deintercalating lithium ions generated during battery reaction wherein said anode has an improved strength against a stress caused when expanded or shrunk due to the deposition or release of lithium upon repeating the charging and discharging cycle and allows lithium to deposit upon charging such that granules of lithium are uniformly and substantially two-dimensionally grown in said coat or at interfaces of said coat without the generation of a dendrite of lithium, said rechargeable lithium battery always exhibiting an excellent battery performance while maintaining a high battery voltage and without causing internal-shorts between the anode and cathode and having high energy density and long charging and discharging cycle life.

A further object of the present invention is to provide a highly reliable, high performance rechargeable lithium battery provided with an improved anode comprising (a) an anode substrate comprising at least an electrically conductive material which is covered by (b) a coat comprising a composite of (b-i) a specific metal oxide material of 1.5 V or less, or preferably, 1.0 V or less in standard electrode potential difference or electromotive force with respect to lithium and capable of intercalating or deintercalating lithium ions generated during battery reaction and (b-ii) an organic high molecular weight material which is highly resistant to organic solvents, acids and alkalies, and is insoluble to an electrolyte solution for a rechargeable lithium battery wherein said coat is fixed to said anode substrate with improved adhesion, said anode excelling in resistance to chemicals, structurally stable such that it is hardly deformed or cracked when expanded or shrunk due to the deposition or release of lithium upon repeating the charging and discharging cycle, and allowing lithium to deposit upon charging such that granules of lithium are uniformly and substantially two-dimensionally grown in said coat or at interfaces of said coat without the generation of a dendrite of lithium, said rechargeable lithium battery always exhibiting an excellent battery performance while maintaining a high battery voltage and without causing internal-shorts between the anode and cathode and having high energy density and long charging and discharging cycle life.

A further object of the present invention is to provide a highly reliable, high performance rechargeable lithium battery which is free of the generation or growth of a dendrite of lithium upon charging, always exhibits an excellent battery performance while maintaining a high battery voltage and without causing internal-shorts between the anode and cathode, and has high energy density and long charging and discharging cycle life, said rechargeable lithium battery comprising an anode, a separator, a cathode, an electrolyte or an electrolyte solution, and a housing, wherein said anode comprises (a) an anode substrate containing at least an electrically conductive material which is covered by (b) a coat comprising a specific metal oxide material of 1.5 V or less, or preferably, 1.0 V or less in standard electrode potential difference or electromotive force with respect to lithium and capable of intercalating or deintercalating lithium ions generated during reaction in which lithium is deposited upon charging such that granules of lithium are uniformly and substantially two-dimensionally grown in said coat or at interfaces of said coat without the generation of a dendrite of lithium, and said anode being structurally stable such that it is hardly deformed or cracked when expanded or shrunk due to the deposition or release of lithium upon repeating the charging and discharging cycle.

A further object of the present invention is to provide a highly reliable, high performance rechargeable lithium battery which is free of the generation or growth of a dendrite of lithium upon charging, always exhibits an excellent battery performance while maintaining a high battery voltage and without causing internal-shorts between the anode and cathode, and has high energy density and long charging and discharging cycle life, said rechargeable lithium battery comprising an anode, a separator, a cathode, an electrolyte or an electrolyte solution, and a housing, wherein said anode comprises (a) an anode substrate comprising at least an electrically conductive material which is covered by (b) a coat comprising a composite of (b-i) a specific metal oxide material of 1.5 V or less, or preferably, 1.0 V or less in standard electrode potential difference or electromotive force with respect to lithium and capable of intercalating or deintercalating lithium ions generated during battery reaction and (b-ii) an organic high molecular material which is highly resistant to organic solvents, acids and alkalies, and is insoluble to an electrolyte solution for a rechargeable lithium battery wherein said coat is fixed to said anode substrate with an improved adhesion, said anode excelling in resistance to chemicals, structurally stable such that it is hardly deformed or cracked when expanded or shrunk due to the deposition or release of lithium upon repeating the charging and discharging cycle, and allowing lithium to deposit upon charging such that granules of lithium are uniformly and two-dimensionally grown in said coat or at interfaces of said coat without causing the generation of a dendrite of lithium.

A further object of the present invention is to provide a process for the production of any of the foregoing anodes for a rechargeable lithium battery, said process comprising the steps of: (a) providing an anode substrate for a rechargeable lithium battery and (b) applying a polyacid solution or a peroxo-polyacid solution onto the surface of said substrate, whereby forming a metal oxide film so that said metal oxide film covers a surface of said substrate.

A further object of the present invention is to provide a process for the production any of the foregoing rechargeable lithium batteries, characterized in that an anode therefor is formed by providing an anode substrate for a rechargeable lithium battery and applying a composition comprising a polyacid solution or a peroxo-polyacid solution and a material selected from the group consisting of inorganic metal element-containing high molecular weight materials, fluororesins, and polyolefins onto a surface of said substrate, whereby forming a film comprising a composite of a metal oxide and a high molecular weight material so that said film covers the surface of said substrate.

DESCRIPTION OF THE INVENTION AND PREFERRED EMBODIMENTS

Figure 1:
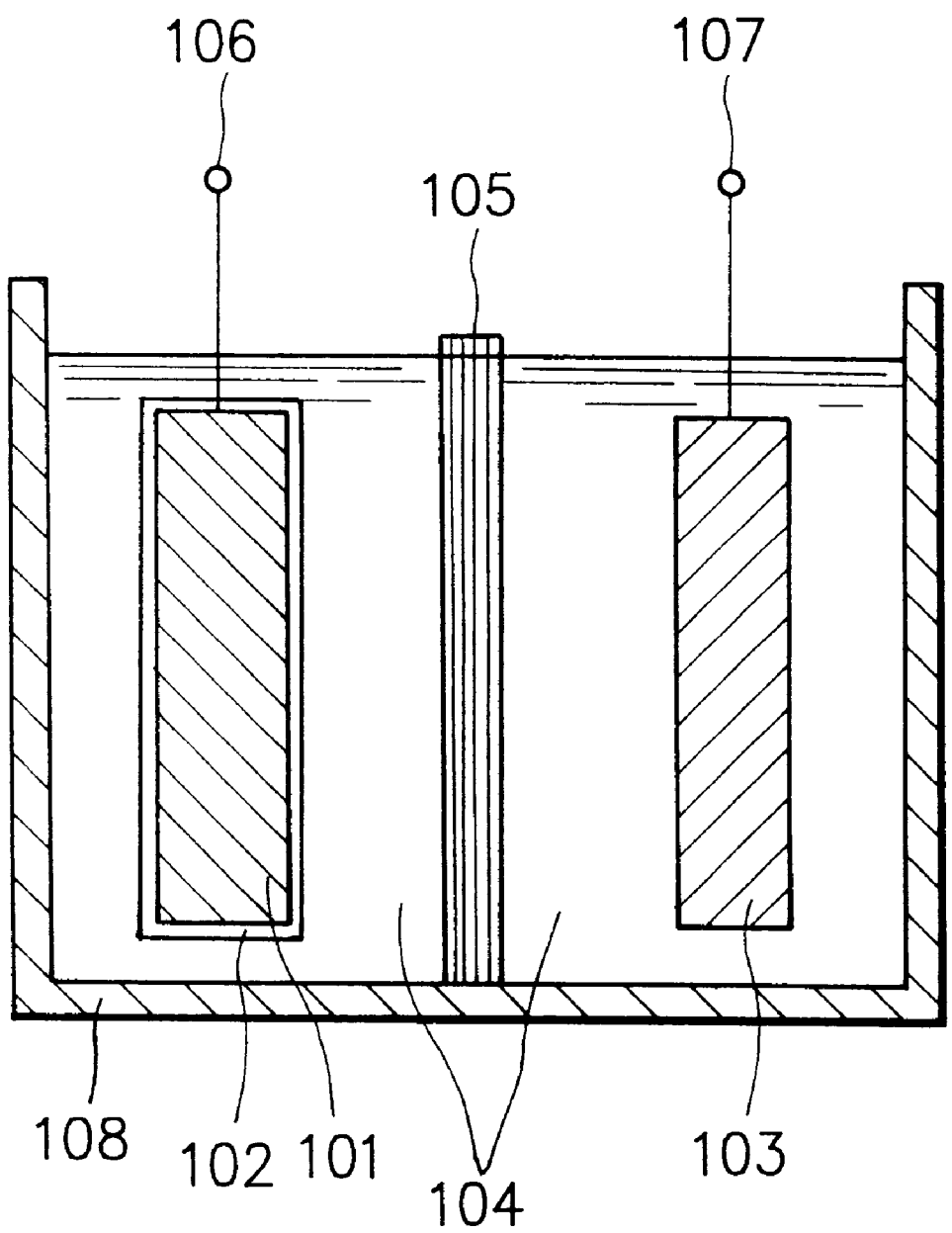
FIG. 1 is a schematic diagram illustrating the constitution of an example of a rechargeable lithium battery according to the present invention.

The present invention is directed to eliminating the foregoing problems in found in the prior art and to attaining the above described objects.

The present inventors made extensive studies through experiments in order to attain a highly reliable, high performance rechargeable lithium battery which is free of the problems found in the conventional rechargeable battery, by focusing on the anode. Particularly the present inventors made the anode for a rechargeable lithium battery such that it comprises (a) an anode substrate comprising at least an electrically conductive material and (b) a coat disposed on said anode substrate so as to cover at least a surface thereof situated to oppose a cathode, said coat comprising a film comprised of a specific amorphous metal oxide material of 1.5 V or less in standard electrode potential difference or electromotive force with respect to lithium and capable of intercalating or deintercalating lithium ions generated during battery reaction, said metal oxide material comprising at least an element selected from the group consisting of W, Mo, Ti, V, Nb, Zr, Hf, Ta, and Cr. As a result, there were obtained findings that the resultant anode is structurally stable such that it is hardly deformed or cracked when expanded or shrunk due to the deposition or release of lithium upon repeating the charging and discharging cycle. The anode exhibits a property of allowing lithium to deposit upon charging such that granules of lithium are uniformly and substantially two-dimensionally grown in said coat or at interfaces of said coat without the generation of a dendrite of lithium. A rechargeable lithium battery provided with said anode is highly reliable in that it exhibits excellent battery performance while providing a sufficient service capacity and without causing the generation or growth of a dendrite of lithium even upon charging at a high speed and has long charging and discharging cycle life. Particularly, a rechargeable battery lithium battery provided with this anode exhibits excellent battery performance while stably maintaining high battery voltage and without causing internal-shorts between the anode and cathode and is high in energy density and has a prolonged charging and discharging cycle life.

Further, in the case where the above film of the coat (b) is comprised of a composite of the foregoing specific amorphous metal oxide material and an organic high molecular material, which is highly resistant to organic solvents, acids and alkalies, and is insoluble to an electrolyte for a rechargeable lithium battery, it was found that there further advantages are provided in that the amorphous metal oxide material is situated in a state that it is hardly released and the coat is fixed to the anode substrate with an improved adhesion. Because of these factors the structural stability of the anode is improved. In addition to these advantages, the foregoing anode's property of allowing lithium to deposit in the foregoing state is improved.

Herein, the term "electromotive force" means a electromotive force under standard condition. The term "standard electrode potential difference" is of the same meaning as the term "electromotive force". Particularly, for instance, in the case of a tungsten oxide film, its standard electrode potential difference or electromotive force means a open-circuit voltage generated when a lithium metal and said tungsten oxide film are immersed in an electrolyte solution containing 1 mol/kg of lithium ion which is maintained at a predetermined temperature.

The present invention has been accomplished based on the above findings.

A principal feature of the present invention lies in an improved anode for a rechargeable lithium battery.

A first typical embodiment of the anode according to the present invention comprises (a) an anode substrate comprising at least an electrically conductive material and (b) a coat disposed on said anode substrate so as to cover at least a surface thereof situated to oppose a cathode, said coat comprising a film comprised of a specific amorphous metal oxide material of 1.5 V or less, or preferably, 1.0 V or less in standard electrode potential difference or electromotive force with respect to lithium and capable of intercalating or deintercalating lithium ions generated during battery reaction wherein said coat (b) is fixed to said anode substrate (a) with a good adhesion.

A second typical embodiment of the anode according to the present invention comprises (a) an anode substrate comprising at least an electrically conductive material and (c) a coat disposed on said anode substrate so as to cover at least a surface thereof situated to oppose a cathode, said coat (c) comprising a film comprised of a composite of (c-i) a specific amorphous metal oxide material of 1.5 V or less, or preferably, 1.0 V or less in standard electrode potential difference or electromotive force with respect to lithium and capable of intercalating or deintercalating lithium ions generated during battery reaction and (c-ii) an organic high molecular weight material which is highly resistant to organic solvents, acids and alkalies, and is insoluble to an electrolyte solution for a rechargeable lithium battery, wherein said metal oxide material is situated in a state that it is hardly released and said coat (c) is fixed to said anode substrate (a) with improved adhesion.

The anode of the first embodiment for a rechargeable lithium battery according to the present invention is structurally stable such that it is hardly deformed or cracked when expanded or shrunk due to the deposition or release of lithium upon repeating the charging and discharging cycle and it exhibits a property of allowing lithium to deposit upon charging such that granules of lithium are uniformly and substantially two-dimensionally grown in the coat or at interfaces of the coat without the generation of a dendrite of lithium.

The anode of the second embodiment for a rechargeable lithium battery according to the present invention provides, in addition to the advantages provided by the anode of the first embodiment, further advantages in that the amorphous metal oxide material is situated in a state where it is hardly released, and the coat is fixed to the anode substrate with an improved adhesion. Because of these factors, the structural stability of the anode is improved. In addition to these advantages, the anode's property of allowing lithium to deposit in the foregoing state is improved.

The present invention provides a rechargeable lithium battery provided with the above anode of the first embodiment or the above anode of the second embodiment.

That is, a first typical embodiment of the rechargeable lithium battery according to the present invention comprises an anode, a separator, a cathode, an electrolyte (or an electrolyte solution), and a housing, characterized in that said anode comprises (a) an anode substrate comprising at least an electrically conductive material and (b) a coat disposed on said anode substrate so as to cover at least a surface thereof situated to oppose the cathode, said coat comprising a film comprised of a specific amorphous metal oxide material of 1.5 V or less, or preferably, 1.0 V or less in standard electrode potential difference or electromotive force with respect to lithium and capable of intercalating or deintercalating lithium ions generated during battery reaction wherein said coat (b) is fixed to said anode substrate (a) with a good adhesion.

A second typical embodiment of the rechargeable lithium battery according to the present invention comprises an anode, a separator, a cathode, an electrolyte (or an electrolyte solution), and a housing, characterized in that said anode comprises (a) an anode substrate comprising at least an electrically conductive material and (c) a coat disposed on said anode substrate so as to cover at least a surface thereof situated to oppose the cathode, said coat (c) comprising a film comprised of a composite of (c-i) a specific amorphous metal oxide material of 1.5 V or less, or preferably, 1.0 V or less in standard electrode potential difference or electromotive force with respect to lithium and capable of intercalating or deintercalating lithium ions generated during battery reaction and (c-ii) an organic high molecular weight material which is highly resistant to organic solvents, acids and alkalies, and is insoluble to an electrolyte solution for a rechargeable lithium battery wherein said metal oxide material is situated in a state where it is hardly released and said coat (c) is fixed to said anode substrate (a) with an improved adhesion.

Any of these rechargeable lithium batteries according to the present invention is highly reliable in that it exhibits an excellent battery performance while providing a sufficient service capacity and without causing the generation or growth of a dendrite of lithium even upon charging at a high speed and is long in charging and discharging cycle life. Particularly, these rechargeable batteries exhibit an excellent battery performance while stably maintaining a high battery voltage and without causing internal-shorts between the anode and cathode and is high in energy density and has a prolonged charging and discharging cycle life.

Any of the foregoing anodes for a rechargeable lithium battery may be provided with a further coat comprising a film formed of a high molecular weight material such as fluororesin which is insoluble to an electrolyte solution for a rechargeable lithium batter and not decomposed by the charging and discharging reactions and has a property of allowing lithium ion to pass through. The use of this anode enables one to obtain a rechargeable lithium battery having a further prolonged charging and discharging cycle life.

Further, in any of the foregoing anodes for a rechargeable lithium battery, it is possible for the surface of the anode substrate (a) on which the foregoing coat (b) or (c) is disposed to be of a roughened surface provided by subjecting the surface of the anode substrate to etching treatment. In this case, the adhesion of the coat (b) or (c) with the anode substrate is ensured so that the coat (b) or (c) is hardly removed from the anode substrate.

In the present invention, the foregoing amorphous metal oxide material is desired to comprise at least an element selected from the group consisting of W, Mo, Ti, V, Nb, Zr, Hf, Ta, and Cr.

In the present invention, the above described amorphous metal oxide material is the most effective. However, it is possible to use, instead of the amorphous metal oxide material, a polycrystalline metal oxide material of 1.5 V or less in standard electrode potential difference or electromotive force with respect to lithium and capable of intercalating or deintercalating lithium ions generated during battery reaction.

In the following, the present invention will be detailed while referring to FIG. 1 and FIG. 2 which are schematic explanatory diagram each illustrating an example of the constitution of an example of a rechargeable lithium battery according to the present invention, in which any of the foregoing anodes according to the present invention, a cathode, a separator and an electrolyte (or an electrolyte solution) are combined.

Figure 2:
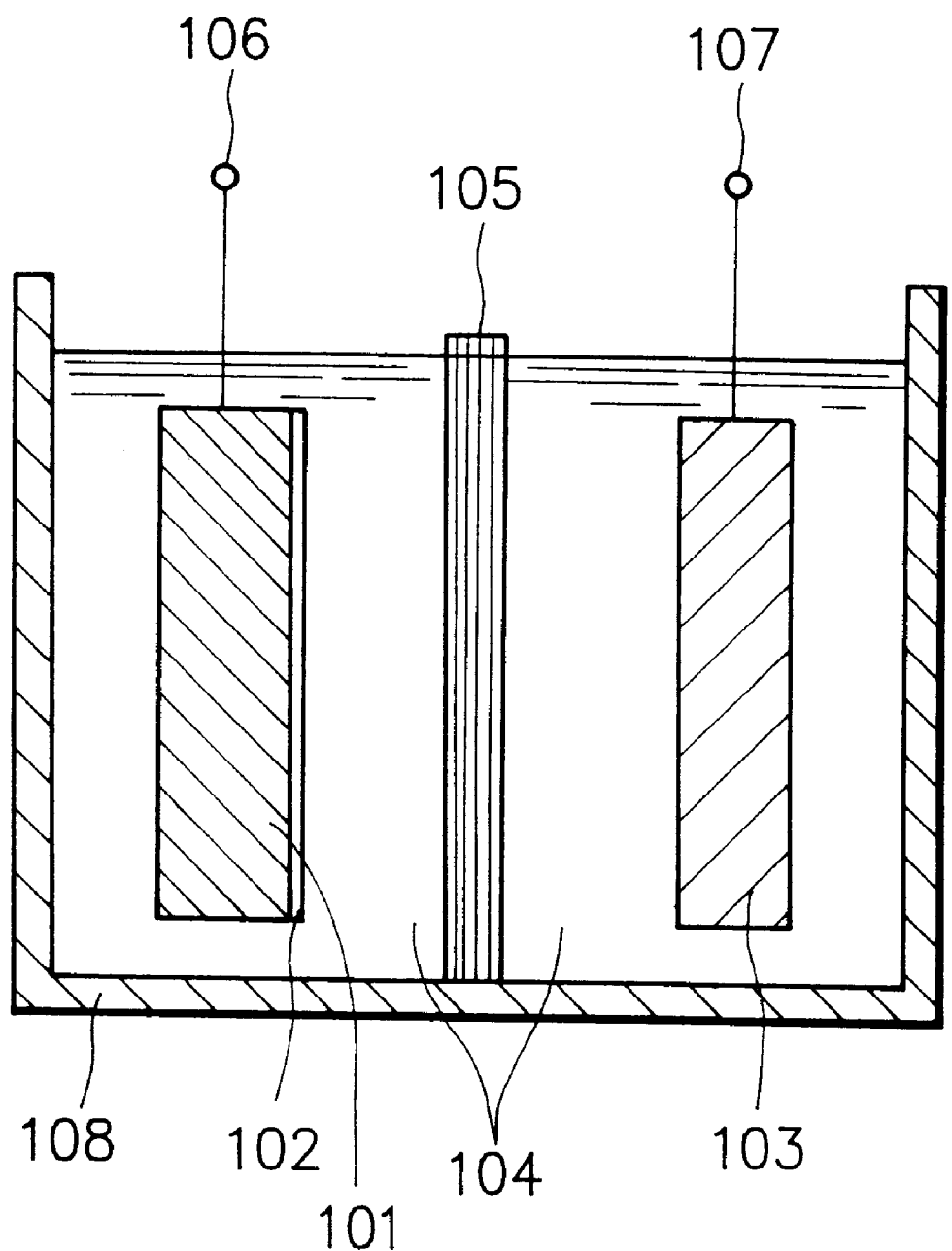
FIG. 2 is a schematic diagram illustrating the constitution of another example of a rechargeable lithium battery according to the present invention.

In FIGS. 1 and 2, reference numeral 101 indicates an anode comprising an anode substrate which is covered by a coat 102, reference numeral 103 a cathode, reference numeral 104 an electrolyte solution, reference numeral 105 a separator, reference numeral 106 an anode terminal, reference numeral 107 a cathode terminal, and reference numeral 108 a housing. The anode 101 in FIG. 1 comprises the above described anode of the first embodiment or the above described anode of the second embodiment wherein the foregoing coat (b) or (c) is disposed so as to cover the entire surface of the foregoing anode substrate (a). The anode 101 in FIG. 2 comprises the above described anode of the first embodiment or the above described anode of the second embodiment wherein the foregoing coat (b) or (c) is disposed so as to cover a surface of the foregoing anode substrate (a) situated to oppose to the cathode 103.

As apparent from FIGS. 1 and 2, the anode 101 and the cathode 103 are arranged to contact with the electrolyte solution 104 and oppose each other. And the separator 105 is disposed between the anode 101 and the cathode 103 in order to prevent the occurrence of internal-shorts between the two electrodes.

In the following, description will be made of each constituent of a rechargeable battery according to the present invention.

ANODE

The anode disposed in a rechargeable battery according to the present invention may be any of the following two typical embodiments A and B.

Embodiment A: an anode comprises (a) an anode substrate and (b) a coat disposed on said anode substrate so as to cover at least a surface thereof situated to oppose to a cathode, said coat (b) comprising a film comprised of a specific amorphous metal oxide material of 1.5 V or less, or preferably, 1.0 V or less in normal electrode potential difference or electromotive force with respect to lithium and capable of intercalating or deintercalating lithium ions generated during battery reaction.

Embodiment B: an anode comprises (a) an anode substrate and (c) a coat disposed on said anode substrate so as to cover at least a surface thereof situated to oppose a cathode, said coat (c) comprising a film comprised of a composite of (c-i) a specific amorphous metal oxide material of 1.5 V or less, or preferably, 1.0 V or less in standard electrode potential difference or electromotive force with respect to lithium and capable of intercalating or deintercalating lithium ions generated during battery reaction and (c-ii) an organic high molecular material which is highly resistant to organic, solvents, acids and alkalies, and is insoluble to an electrolyte solution for a rechargeable lithium battery.

In any case, the above amorphous metal oxide material is the most effective. However, instead of the amorphous metal oxide material, it is possible to use a polycrystalline metal oxide material of 1.5 V or less in standard electrode potential difference or electromotive force with respect to lithium and capable of intercalating or deintercalating lithium ions generated during a battery reaction.

Any of the above two anodes may be provided with a further coat comprising an insulating film or a semiconductor film which are insoluble to an electrolyte solution for a rechargeable lithium battery and not decomposed by the charging and discharging reactions and has a property of allowing lithium ion to pass through but not allowing metallic lithium to pass through.

Further, in any of the above two anodes, it is possible for the surface of the anode substrate (a) on which the coat (b) or (c) is disposed to be of a roughened surface provided by subjecting the surface of the anode substrate to etching treatment.

In the following, description will be made of the anode substrate (a).

The anode substrate (a) comprises an electrically conductive material or an electrically conductive material and an anode active material. These materials can include Al, Ti, Mg, Cu, Ni, Fe, Pt, Au, C, Li, and alloys of these materials.

The electrically conductive material may be shaped in a plate-like form, foil-like form, mesh form, porous form-like sponge, punching metal form, expanded metal form, fibrous form, powder-like form, flake-like form, or cloth-like form.

In the case where the electrically conductive material is shaped to have a powdery form, flake-like form or fibrous form which cannot retain a stabilized form capable of serving as an electrode as it is, it is possible to make into a stable form by using an appropriate binding agent such as alkali-glass or binder resin. The resultant thus obtained may be sintered. In this case, other than the binder, an electrically conductive auxiliary may be used in order to improve the current collecting property of the electrically conductive material. The binding agent used is desired to be stable to an electrolyte solution used in a rechargeable lithium battery. Specific examples of the binder resin are polytetrafluoroethylene, polyvinylidene fluoride, polyethylene, polypropylene, ethylene-propylene copolymer, and ethylene-propylene-diene-terpolymer. Specific examples of the electrically conductive auxiliary are carbon blacks such as ketjen black and acetylene black, and powdery or fibrous carbons such as graphite. It is possible that an electrically conductive material in a powdery form, fibrous form, or flake-like form is applied onto the surface of an electrically conductive material in a plate-like form, foil-like form, mesh form, porous form-like sponge, punching metal form, expanded metal form, or cloth-like form by means of an appropriate coating manner while bonding the former to the surface of the latter by means of a binding agent, to thereby form an anode substrate. The coating manner in this case can include screen printing, coater coating, and spray coating.

In the present invention, the anode substrate may be made to have a roughened surface on which the coat (b) or (c) is to be disposed by subjecting the anode substrate to etching treatment. In this case, the adhesion of the coat (b) or (c) is ensured so that the coat (b) or (c) is hardly removed from the anode substrate. The surface etching treatment in this case provides further advantages such that the anode's specific surface area is increased to provide a substantial reduction in the current density.

The etching treatment can include chemical etching, electrochemical etching, and plasma etching.

The chemical etching may be conducted in a manner of contacting a surface of the anode substrate to be subjected to surface treatment with an etching solution containing an acid or alkali to make the surface of the anode reacted with said acid or alkali whereby etching the surface of the anode substrate into a roughened surface. As the etching solution, there is used an appropriate etching solution depending upon the constituent electrically conductive material of the anode substrate. In the case where the electrically conductive material constituting the anode substrate is aluminum, there may be used an etching solution comprising a solution of a compound selected from the group consisting of phosphoric acid, sulfuric acid, hydrochloric acid, nitric acid, acetic acid, hydrofluoric acid, potassium hydroxide, sodium hydroxide, and lithium hydroxide. Other than these, mixtures of these solutions are also usable. In the case where the electrically conductive material constituting the anode substrate is nickel, there may be used an etching solution comprising a solution of nitric acid or dilute acid. In the case where the electrically conductive material constituting the anode substrate is copper, there may be used an etching solution comprising a solution of an inorganic acid such as sulfuric acid, hydrochloric acid, or nitric acid, or a solution of an organic acid such as acetic acid. Other than these, a solution of cupric chloride, a solution of ferric chloride, and aqueous ammonia are also usable. In the case where the electrically conductive material constituting the anode substrate is titanium, there may be used an etching solution comprising a solution of hydrofluoric acid or phosphoric acid.

The electrochemical etching may be conducted in a manner of positioning the anode substrate and a counter electrode in an electrolyte solution for the electrochemical etching and applying an electric field between the two to electrochemically elute the constituent metallic material of a surface of the anode substrate to be subjected to surface treatment in the form of a metal ion, whereby etching the surface of the anode substrate into a roughened surface. As the electrolyte solution in this case, there is used an appropriate electrolyte solution depending upon the kind of the constituent electrically conductive material of the anode substrate. In the case where the electrically conductive material constituting the anode substrate is aluminum, there may be used an electrolyte solution comprising a solution of a compound selected from the group consisting of hydrochloric acid, phosphoric acid, sulfuric acid, chromic acid, and ammonium chloride. Other than these, mixtures of these solutions are also usable. In the case where the electrically conductive material constituting the anode substrate is copper, there may be used an electrolyte solution comprising a solution of hydrochloric acid or phosphoric acid.

The plasma etching may be conducted in a manner of converting an etching gas into a plasma containing reactive ions and radicals and reacting a surface of the anode substrate to be subjected to surface treatment with said reactive ions and radicals, whereby etching the surface of the anode substrate into a roughened surface. The etching gas usable in this case can include argon gas, tetrachloromethane, tetrafluoromethane, chlorine, trichloromonofluoromethane, dichlorodifluoromethane, and chlorotrifluoromethane.

In the following, description will be made of the coat (b) and the coat (c).

As above described, the metal oxide material constituting the coat (b) or (c) is required to be 1.5 V or less in standard electrode potential difference or electromotive force with respect to lithium and capable of intercalating or deintercalating lithium ions generated during a battery reaction. In a preferred embodiment, the metal oxide material is 1.0 V or less in standard electrode potential difference or electromotive force with respect to lithium. Specifically, the metal oxide material is desired to comprise at least a transition metal element selected from the group consisting of W, Mo, Ti, V, Nb, Zr, Hf, Ta, and Cr.

In the case where the metal oxide material is comprised of W, Mo or a combination of these elements, it exhibits a standard electrode potential difference (or an electromotive force) with respect to lithium. The use of this metal oxide material (which is amorphous) as the constituent of the coat (b) or (c) makes the resulting anode to be such that stably exhibits a high battery voltage.

As for the mechanism in the anode according to the present invention wherein lithium to be deposited upon charging such that granules of lithium are uniformly and substantially two-dimensionally grown in the coat (b) or (c) or at interfaces thereof, it is considered such that lithium ions are intercalated in the transition metal oxide material of the coat (b) or (c) in contact with the electrically conductive material of the anode substrate to increase the electrical conductivity of the transition metal oxide material and other lithium ions remained without being engaged in the intercalation deposit respectively in a granular form based on a nucleus of the transition metal oxide material on the surface of the transition metal oxide material wherein those lithium granules are uniformly and two-dimensionally grown in the anode surfaces including the layer of the transition metal oxide material.

The formation of a film of the metal oxide material on the surface of the anode substrate may be conducted by a manner of providing a coating liquid containing a given transition metal oxide material, applying said coating liquid onto the surface of the anode substrate by means of an appropriate coating process such as screen printing, coater coating, spray coating, spin coating, or dip coating, and subjecting the resultant to heat treatment at a desired temperature of preferably less than 350° C. or more preferably, less than 250° C., whereby forming a film composed of an amorphous metal oxide material on the surface of the anode substrate. In this case, when said heat treatment is conducted at a temperature of more than 350° C., or preferably, 450° C. or above, there is provided a film composed of a polycrystalline metal oxide material.

Alternatively, the formation of a film of the metal oxide material on the surface of the anode substrate may be conducted by means of a sputtering process, electron beam evaporating process, or cluster ion evaporation process.

Other than these, the formation of a film of the metal oxide material on the surface of the anode substrate may be conducted by means of a thermal-induced CVD process or plasma CVD process using a liquid or gas containing atoms of an element capable of providing said film.

The formation of a film of the metal oxide material on the surface of the anode substrate is preferably conducted by means of the coating process such as screen printing, coater coating, spray coating, spin coating, or dip coating, in view of the ease of film formation and the relatively low cost for an apparatus used therefor. In this case, there are also advantages in that an increase in the physical strength of the film formed may be readily obtained and a desired film composite may be readily obtained.

The transition metal oxide-containing coating liquid used in this case can include a solution of a desired polyacid and a solution of a desired peroxo polyacid. The polyacid can include polyacids containing a number of acid anhydride molecules obtained as a result of hydration of oxides of a metal element belonging to group V of the periodic table such as V, Nb, and Ta and a metal element belonging to group VI of the periodic table such as Cr, Mo, and W wherein acid molecules are condensed. The peroxo polyacid can include those comprising said polyacids oxygen atoms of which being partially substituted by a peroxide group. Specific examples are polytangstic acids represented by the general equation: $WO_3 \cdot yH_2O$ and peroxo polytangstic acids represented by the general equation: $2WO_3 \cdot H_2O_2 \cdot nH_2O$.

The use of a solution of a given polyacid or a given peroxo polyacid makes it possible to readily form a desired amorphous metal oxide film by applying said solution onto the surface of the anode substrate and subjecting the resultant to heat treatment at a predetermined temperature capable of attaining the formation of said amorphous metal oxide film. In this case, there can be easily attained a composite film by simply admixing an appropriate high molecular material to the coating solution.

In the case where the amorphous metal oxide film is combined with a desired organic high molecular weight material into a composite, there can be attained the formation of a coat excelling in physical strength. The formation of such a coat may be readily conducted by mixing a desired organic high molecular weight material with a solution containing a given metal oxide material to obtain a coating liquid, applying said coating liquid onto the surface of the anode substrate by means of the foregoing coating process, and subjecting the resultant to heat treatment at a predetermined temperature capable of attaining the formation of a desired amorphous metal oxide film. In this case, when an appropriate high molecular weight gel capable of retaining an electrolyte solution for a rechargeable lithium battery is used as the organic high molecular weight material, there can be attained the formation of a coat comprising a desirable composite film which provides a pronounced advantage in that an electrolyte solution for a rechargeable lithium battery comes to present in close proximity to the amorphous metal oxide material. This situation facilitate the uniform deposition of lithium in a granular form.

In order to attain the formation of a coat comprising a composite film in which the amorphous metal oxide material is uniformly dispersed, it is preferable to use an organic high molecular weight material having at least two bonds of a polar group selected from the group consisting of hydroxyl group, carboxyl group, and amide group per one molecule which has an affinity for the amorphous metal oxide material. Specific examples of such organic high molecular weight materials are polyvinylalcohol, polyvinylacetate, polyethyleneglycol, polyethyleneoxide, poly(2-methyl-2-oxazoline), poly(N-vinylpyrrolidone), and poly(N,N-dimethylacrylamide).

In order to make the composite film sufficiently rigid, it is preferable to use an organic metal compound such as a silane coupling agent or a titanate coupling agent.

The composite film comprised of the amorphous metal oxide material and organic high molecular weight material is preferably insoluble in an electrolyte solution for a rechargeable lithium battery and stable against the charging and discharging reactions. For this purpose, the organic high molecular weight material is preferably crosslinked. The crosslinking of the organic high molecular weight material may be conducted by way of crosslinking reaction with the use of a crosslinking agent or with the irradiation of ultraviolet rays or radiant rays.

As the organic high molecular weight material, it is possible to use other organic high molecular weight materials such as silicone resins, fluororesins and polyolefins which are inherently insoluble to the electrolyte solution and stable against the charging and discharging reactions.

As for the thickness of the coat (b) or (c), it should be properly determined depending upon the battery characteristics required for a rechargeable lithium battery obtained. However, in view of the film-forming efficiency and the efficiency for of an electric current to flow, it is preferably to be in the range of 500 Å to 30 μm, more preferably in the range of 1000 Å to 20 μm, most preferably in the range of 1000 Å to 10 μm.

As above described, either the foregoing anode A or the foregoing anode B may be provided with a further coat comprising an insulating film or a semiconductor film which are insoluble to the electrolyte solution for a rechargeable lithium battery and not decomposed by the charging and discharging reactions and have a property of allowing lithium ion to pass through but not allowing metallic lithium to pass through. In this case, the effect of the anode to prevent the generation of a dendrite of lithium upon charging is further improved. Such insulating or semiconductor film can includes those having pores capable of allowing lithium ion to pass through or a molecular structure capable of allowing lithium ion to pass through. Specific examples of the insulating or semiconductor film having said molecular structure capable of allowing lithium ion to pass through can include films of high molecular weight materials having a large ring structure or an ether bond-bearing structure. The insulating or semiconductor film having pores capable of allowing lithium ion to pass through may be formed in a manner of providing a coating liquid for the formation of the insulating or semiconductor which contains a material capable of being eluted after the film formation or a foaming agent or a material capable of being readily thermally decomposed, applying the coating liquid onto the surface of the anode, and subjecting the resultant to treatment to elute the elutable material, to make the foaming agent to cause foams, or to thermally decompose the material capable of being thermally decomposed whereby forming the foregoing pores in the resulting film.

CATHODE

The cathode in the present invention generally comprises a cathode collector, a cathode active material, an electrically conductive material, and a binding agent.

The cathode is usually formed, for example, by disposing a mixture of a cathode active material, an electrically conductive material and a binding agent on a member capable of serving as a cathode collector.

The electrically conductive material used in the cathode can include powdery or fibrous aluminum, nickel, stainless steel and graphite. Other than these, carbon blacks such as ketjen black and acetylene black are also usable.

The binding agent is desired to be stable against an electrolyte (or an electrolytic solution) used in a rechargeable lithium battery.

Specific examples of such binding agent are polyolefines such as polyethylene, polypropylene, ethylene-propylene copolymer, and ethylene-propylene-diene-terpolymer; and fluorine-containing resins (or fluororesins) such as polyvinylidene fluoride.

The cathode collector of the cathode serves to supply an electric current so that it can be efficiently consumed for the battery reaction upon charging and to collect an electric current generated upon discharging. The cathode collector is therefore preferably constituted by a material which has a high electrical conductivity and is inactive to the battery reaction.

The cathode collector may include Ni, Ti, Al, Pt, V, Au, Zn, and alloys of two or more of these metals such as stainless steel.

The cathode collector may be shaped in a plate-like form, foil-like form, mesh form, porous form-like sponge, fibrous form, punching metal form, or expanded metal form.

As the cathode active material, there is usually used a compound selected from the group consisting of transition metal oxides and transition metal sulfides. The elements of these transition metal oxides and transition metal sulfides can include elements partially having a d-shell or f-shell. Specific examples of such element are Sc, Y. lanthanoids, actinoids, Ti, Zr, Hf, V, Nb, Ta, Cr, Mo, W, Mn, Tc, Re, Fe, Ru, Os, Co, Rh, Ir, Ni, Pd, Pt, Cu, Ag and Au. Of these, Ti, V, Cr, Mn, Fe, Co, Ni and Cu are the most appropriate.

The cathode active material is preferably comprised of any of the above transition metal oxides and transition metal sulfides, which is incorporated with lithium. The lithium-containing cathode active material may be formed by a manner of obtaining a transition metal oxide or transition metal sulfide using lithium hydroxide or lithium salt. Alternatively, it may be formed by a manner of providing a mixture of a given transition metal oxide, transition metal salt, or transition metal sulfide, and lithium hydroxide, lithium nitrate, or lithium carbonate capable of being readily thermally decomposed, and subjecting said mixture to heat treatment.

SEPARATOR

The separator is disposed between the anode and the cathode, and it serves to prevent the anode and the cathode from suffering from internal-shorts. In addition, the separator also serves to retain an electrolyte (or an electrolyte solution) for a rechargeable lithium battery.

The separator is required to have a porous structure or a structure having a number of perforations capable of allowing lithium ion to pass therethrough. Other than this requirement, it is also required to be insoluble in and stable to the electrolyte solution.

The separator is usually constituted by a nonwoven fabric or a membrane having a micropore structure made of glass, polypropylene, polyethylene, fluorine-containing resin, or polyamide. Alternatively, the separator may be constituted by a metal oxide film or a resin film combined with a metal oxide respectively having a plurality of perforations. In a preferred embodiment, the separator is constituted by a multilayered metal oxide film. In this case, the separator effectively prevents a dendrite from passing therethrough and because of this, the occurrence of internal-shorts between the anode and the cathode is desirably prevented. In another preferred embodiment, the separator is constituted by an incombustible fluorine-containing resin, glass or metal oxide film. In this case, an improvement can be attained in terms of the safety even in the case where such internal-shorts should be unexpectedly occurred.

The thickness of the separator should be determined depending upon the configuration and/or the scale of a rechargeable lithium battery. However, in general, the separator is desired to be of a thickness of several microns ($\mu$m) to several millimeters (mm).

ELECTROLYTE

In the present invention, there can be used an appropriate electrolyte as it is, a solution of said electrolyte dissolved in a solvent, or a material of said solution having immobilized using a gelatinizing agent such as polymers. However, an electrolyte solution obtained by dissolving an appropriate electrolyte in an solvent is usually used in a way that said electrolyte solution is retained on the foregoing porous separator.

The higher the electrical conductivity of the electrolyte, the better. Particularly, it is desired to use an electrolyte such that the ionic conductivity at 25° C. is preferably $1 \times 10^{-3}$ S/cm or more or more preferably, $5 \times 10^{-3}$ S/cm or more.

The electrolyte usable can include inorganic acids such as $H_2SO_4$, HCl and $HNO_3$; salts of $Li^+$ (lithium ion) with Lewis acid ion such as $BF_4^-$, $PF_6^-$, $ClO_4^-$, $CF_3SO_3^-$, or $BPh_4^-$ (with Ph being a phenyl group); and mixtures of two or more of said salts.

Other than these electrolytes, salts of the above described Lewis acids ions with cations such as sodium ion, potassium ion, tetraalkylammonium ion, or the like are also usable.

In any case, it is desired that the above salts are used after they are subjected to dehydration or deoxygenation, for example, by way of heat treatment under reduced pressure.

The solvent in which the electrolyte is dissolved can include acetonitrile, benzonitrile, propylene carbonate, ethylene carbonate, dimethyl carbonate, diethyl carbonate, dimethylformamide, tetrahydrofuran, nitrobenzene, dichloroethane, diethoxyethane, 1,2-dimethoxyethane, chlorobenzene, γ-butyrolactone, dioxolan, sulfolan, nitromethane, dimethyl sulfide, dimethoxyethane, methyl formate, 3-methyl-2-oxdazolydinone, 2-methyltetrahydrofuran, 3-propylsydonone, sulfur dioxide, phosphoryl chloride, thionyl chloride, sulfuryl chloride, and mixtures of two or more of these.

As for these solvents, it is desired that they are subjected to dehydration using activated alumina, molecular sieve, phosphorous pentaoxide, or calcium chloride, prior to their use. Alternatively, it is possible for them to be subjected to distillation in an atmosphere composed of inert gas in the presence of an alkali metal, wherein moisture and foreign matters are removed.

In order to prevent leakage of the electrolyte solution, it is desired for the electrolyte solution to be gelatinized using an appropriate gelatinizing agent.

The gelatinizing agent usable in this case can include polymers having a property such that it absorbs the solvent of the electrolyte solution to swell. Specific examples of such polymer are polyethylene oxide, polyvinyl alcohol, and polyacrylamide.

SHAPE AND STRUCTURE OF RECHARGEABLE BATTERY

There is no particular limitation for the shape of the rechargeable lithium battery according to the present invention.

The rechargeable lithium battery according to the present invention may be shaped in a flat round form (or a coin-like form), a cylindrical form, a prismatic form, or a sheet-like form.

As for the structure of the rechargeable lithium battery according to the present invention, it may be optionally made to be of a single layer structure, a stacked structure, or a spiral-wound structure.

In the case where the rechargeable lithium battery is shaped in a spiral-wound cylindrical form, the anode, separator and cathode are arranged in the named order and they are spiral-wound. In this case, the battery area can be advantageously increased as desired and a high electric current can be passed during charging and discharging.

In the case where the rechargeable lithium battery is shaped in a prismatic form, there is provided an advantage in that the space of a device for housing the rechargeable lithium battery can be effectively utilized.

Figure 3:
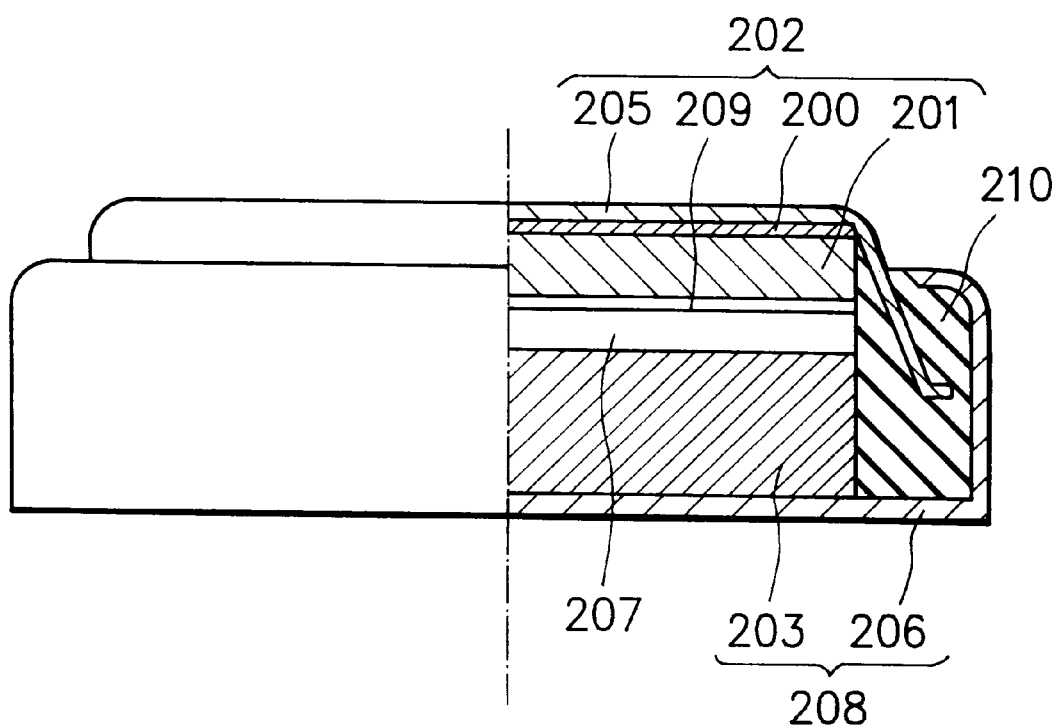
FIG. 3 is a schematic cross-sectional view illustrating an example of a single-layer system flat rechargeable lithium battery according to the present invention.
Figure 4:
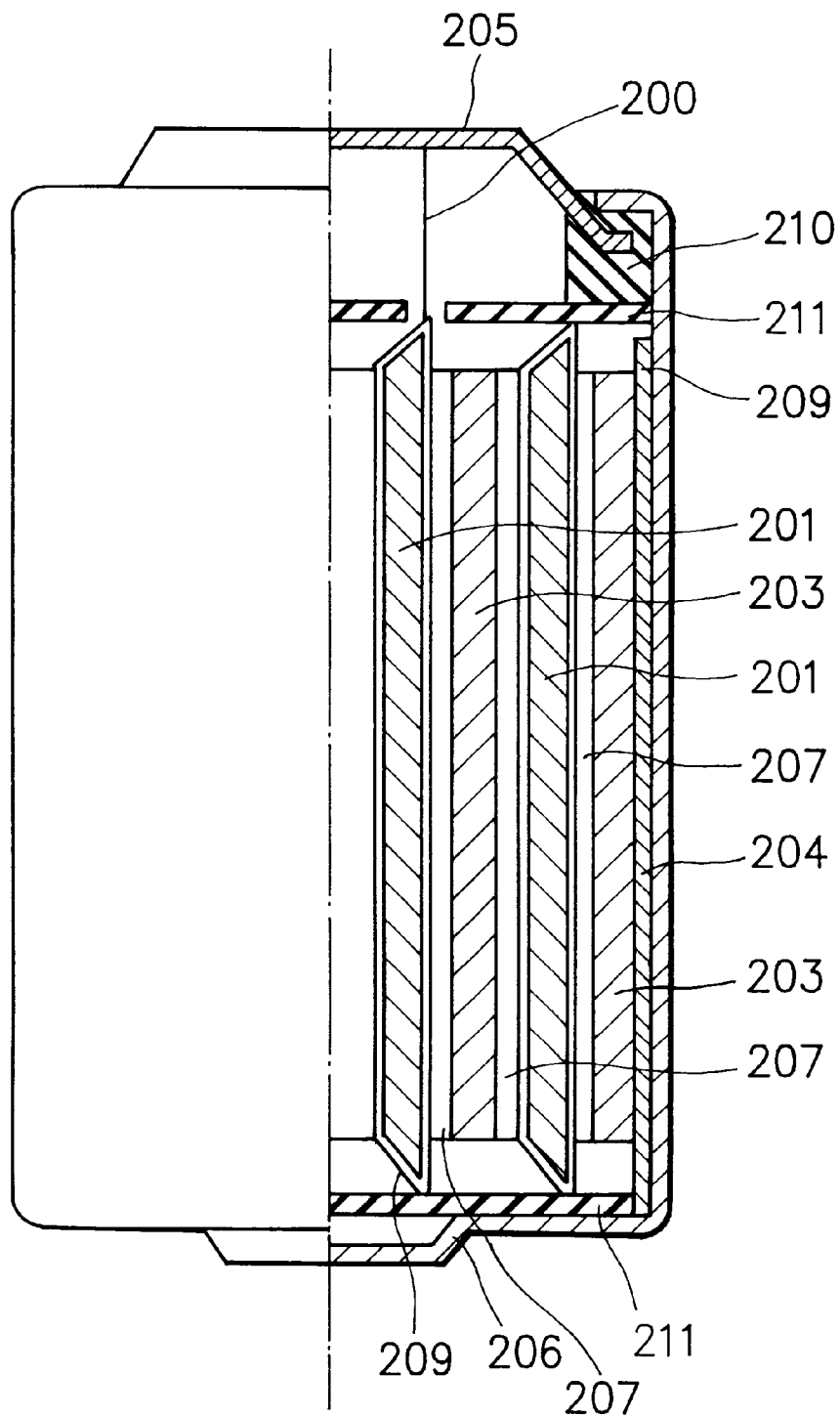
FIG. 4 is a schematic cross-sectional view illustrating an example of a spiral-wound cylindrical rechargeable lithium battery according to the present invention.

FIG. 3 is a schematic cross-sectional view illustrating an example of a single-layer structure type flat rechargeable lithium battery according to the present invention. FIG. 4 is a schematic cross-sectional view illustrating an example of a spiral-wound cylindrical rechargeable lithium battery according to the present invention.

In FIGS. 3 and 4, reference numeral 200 indicates an anode collector, reference numeral 201 an anode active material, reference numeral 202 an anode, reference numeral 203 a cathode active material, reference numeral 204 (in FIG. 4) a cathode collector, reference numeral 205 an anode terminal (or an anode cap), reference numeral 206 a cathode can, reference numeral 207 a separator (which retains an electrolyte or an electrolyte solution), reference numeral 208 (in FIG. 3) a cathode, 209 a specific metal oxide film, 210 an insulating packing, and reference numeral 211 (in FIG. 4) an insulating plate. In the configuration shown in FIG. 3, the cathode can 206 also serves as a cathode collector.

The fabrication of a rechargeable lithium battery of the configuration shown in FIG. 3 or FIG. 4 is conducted, for example, in the following manner. That is, a combination comprising the separator 207 interposed between the anode 202 and the cathode active material 203 is positioned in the cathode can 206. Thereafter, the electrolyte is introduced thereinto. The resultant is assembled with the anode cap 205 and the insulating packing 210, followed by subjecting to caulking treatment. Thus, the fabrication of the rechargeable lithium battery is completed.

The preparation of the constituent materials for the rechargeable lithium battery and the fabrication of said rechargeable lithium battery are preferably conducted in a dry air atmosphere free of moisture or a dry inert gas atmosphere free of moisture in order to prevent the occurrence of chemical reaction of lithium with water and also in order to prevent the rechargeable lithium battery from being deteriorated due to chemical reaction of lithium with water inside of the battery.

As the constituent of the insulating packing 210, there can be used polypropylene resin, fluorine-containing resin, polyamide resin, polysulfone resin, or various rubbers. The sealing is typically conducted using a gasket such as the insulating packing, as shown in FIGS. 3 and 4. Other than this, it can be conducted by means of glass sealing, adhesive sealing, welding or soldering.

As the constituent of the insulating plate 211 shown in FIG. 4, there can be used organic resins and ceramics.

Any of the cathode can 206 and the anode cap 205 may be constituted by an appropriate material which exhibits a sufficient rigidity, physical strength and electrical conductivity. Specific examples of such material are stainless steel, titanium clad steel, copper clad steel, and nickel-plated steel.

In any of the configurations shown in FIGS. 3 and 4, the cathode can 206 is designed to serve also as a battery housing. In the case where a battery housing is independently used, the battery casing may be constituted by a metal such as zinc, an alloy such as stainless steel, a plastic such as polypropylene, or a composite of a metal or glass fiber with plastic.

Although not shown in any of FIGS. 3 and 4, it is possible to employ an appropriate safety vent in any of the configurations shown in FIGS. 3 and 4, which serves to ensure the safety when the inside pressure of the rechargeable battery is incidentally increased, by communicating the inside of the rechargeable battery with the outside to thereby reduce the increased inside pressure of the rechargeable lithium battery. The safety vent may be constituted by an elastic body comprising a rubber or spring, a metal ball, or a rupture foil.

In the following, the present invention will be described in more detail with reference to examples, which are only for illustrative purposes but not intended to restrict the scope of the present invention to these examples.

EXAMPLE 1 AND COMPARATIVE EXAMPLE 1

Example 1

There was prepared a rechargeable lithium battery of the configuration shown in FIG. 3 in the following manner.
Formation of anode:

There was provided a 50 $\mu$m thick aluminum foil as an anode collector. The aluminum foil was subjected to etching treatment using an aqueous solution containing 5 wt. % of potassium hydroxide to make it to have a roughened surface. The aluminum foil thus treated was washed with pure water, followed by drying.

A coating liquid obtained by reacting a powdery tungsten metal with an excess of aqueous hydrogen peroxide solution, decomposing the remaining unreacted hydrogen peroxide solution using a platinum catalyst to obtain an aqueous solution of peroxo-polytungsten acid. The aqueous solution was mixed with isopropyl alcohol and applied onto the roughened surface of the aluminum foil by means of a conventional spin coating process, to thereby form a coat on the roughened surface of the aluminum foil.

The coat formed on the aluminum foil was subjected to drying at 100° C. to thereby form a 0.3 $\mu$m thick amorphous tungsten oxide film on the aluminum foil. Thereafter, a coating liquid, obtained by mixing a xylene solution containing 3 wt. % of a fluororesin paint (trademark name: SPERKONACK, produced by Nippon Oil & Fats Co., Ltd.) with 1 wt. % of an electrolyte solution obtained by dissolving 1 M (mol/l) of tetrafluoro lithium borate in a moisture-free mixed solvent composed of propylene carbonate (PC) and dimethoxyethane (DME) at an equivalent mixing ratio, was applied onto the surface of the amorphous tungsten oxide film by means of a conventional spin coating process, followed by drying. The resultant was subjected to heat treatment at 170° C. under reduced pressure to crosslink the fluororesin, whereby forming a coating film on the amorphous tungsten oxide film. By this, a 1.6 $\mu$m thick two-layered laminate comprising the amorphous tungsten oxide film and the crosslinked fluororesin film stacked in the named order was formed on the roughened surface of the aluminum foil. Thus, there was obtained an anode.

Formation of Cathode

Electrolytic manganese dioxide was mixed with lithium carbonate with a mixing weight ratio of 1:0.4, and subjected to heat treatment at 800° C., to thereby obtain a lithium-manganese oxide. The resultant lithium-manganese oxide, 3 wt. % of powdery acetylene black and 5 wt. % of powdery polyvinylidene fluoride were mixed. The resultant was mixed with N-methyl-2-pyrrolidone to obtain a paste-like product.

The resultant paste-like product was applied onto a surface of an aluminum foil as a cathode collector, followed by subjecting to drying. Thus, there was obtained a cathode.

Preparation of Electrolyte Solution

There was provided a moisture-free mixed solvent composed of propylene carbonate (PC) and dimethoxyethane (DME) at an equivalent mixing ratio. 1 M (mol/l) of tetrafluoro lithium borate was dissolved in the mixed solvent. Thus, there was obtained an electrolyte solution.

Separator

There was provided a 25 $\mu$m thick microporous polypropylene member having a number of perforations as a separator.

Fabrication of Rechargeable Lithium Battery

The fabrication of a rechargeable lithium battery was conducted in a dry argon atmosphere.

The separator was interposed between the cathode and the anode. The resultant was inserted into a cathode can made of titanium clad steel. Then, the electrolyte solution was injected into the cathode can. The resultant was sealed using an anode cap made of titanium clad steel and an insulating packing made of fluoro rubber. Thus, there was obtained a rechargeable lithium battery.

In this way, there were prepared two rechargeable lithium battery samples A1 and A2.

Comparative Example 1

The procedures of Example 1 were repeated, except that in the formation of the anode, the formation of the two-layered laminate comprising the amorphous tungsten oxide film and the crosslinked fluororesin film was not conducted, to thereby obtain two rechargeable lithium battery samples B1 and B2.

Evaluation (1). As for each of the rechargeable lithium battery samples A1 and B1 obtained in Example 1 and Comparative Example 1, the charging was conducted with an electric current under condition of 1 C (electric current of 1 time the electric capacity per an hour based on the electric capacity calculated from the cathode active material of the rechargeable lithium battery sample). Thereafter, the rechargeable lithium battery sample was disassembled in an atmosphere composed of argon gas. And the state of lithium deposited on the anode surface was examined using a microscope. As a result, as for the rechargeable lithium battery sample A1, it was found that lithium is deposited on the anode surface such that lithium granules are uniformly and substantially two-dimensionally grown without the generation of a dendrite of lithium. As for the rechargeable lithium battery sample B1, it was found to have an apparent dendrite of lithium grown on the anode surface. And in the rechargeable lithium battery sample B1, such lithium granules as found in the rechargeable lithium battery sample A1 were not present.

(2). As for each of the remaining rechargeable lithium battery samples A2 and B2, evaluation was conducted with respect to battery characteristics through the charging and discharging cycle test.

The charging and discharging cycle test was conducted in the following manner. That is, the rechargeable lithium battery was placed in a charging and discharging device HJ-106M (produced by Hokuto Denko Kabushiki Kaisha), wherein charging and discharging were alternately repeated under conditions of 0.5 C (electric current of 0.5 time the electric capacity per an hour based on the electric capacity calculated from the cathode active material of the rechargeable lithium battery sample) for the charging and discharging, 30 minutes for the rest, 4.5 V for the cut-off voltage upon charging, and 2.5 V for the cut-off voltage upon discharging.

The charging and discharging cycle test was initiated by charging. In the charging and discharging test, the battery capacity was observed (that is, an energy density, namely, a discharge energy density) per a unit volume of the rechargeable lithium battery and the charging and discharging cycle life. The battery capacity was based on the service capacity after the third repetition of the charging and discharging cycle. And the charging and discharging cycle life was based on the number of the charging and discharging cycle having been repeated until the charging electric potential became 4.5 V.

The observed results obtained are collectively shown in Table 1. Each of the values for Example 1 shown in Table 1 is a value relative to the corresponding value of Comparative Example 1, which is set at 1.

(3). Independently, in order to examine the property of the foregoing amorphous tungsten film of the anode formed in the formation of the anode in Example 1, there was provided a coating liquid obtained by reacting a metallic tungsten material with an excess aqueous hydrogen peroxide solution, decomposing the remaining unreacted hydrogen peroxide solution using a platinum catalyst to obtain a peroxo-polytungsten acid solution. This acid solution was mixed with isopropyl alcohol, and the coating liquid was applied onto a surface of a platinum plate by means of a conventional dip coating process, followed by subjecting to drying and then subjecting to heat treatment at 170° C. to form an amorphous tungsten oxide film on the platinum plate, whereby a test sample was obtained. Other than this, there was provided a lithium metal foil. The test sample and the lithium metal foil were immersed in an electrolyte solution obtained by dissolving 1 M (mol/l) of tetrafluoro lithium borate in a moisture-free mixed solvent composed of propylene carbonate (PC) and dimethoxyethane (DME) at an equivalent mixing ratio, wherein the electromotive force between the test sample and the lithium metal foil was measured using a voltmeter. As a result, the electromotive force was found to be less than 1.0 V.

From the evaluated results obtained in the above, it is understood that the rechargeable lithium battery obtained in Example 1 has a prolonged charging and discharging cycle life and an excellent energy density which are greater than those of the rechargeable lithium battery obtained in Comparative Example 1.

In addition, as for the rechargeable lithium battery obtained in Example 1, it was found that lithium is deposited in a granular form upon operating the charging without causing the generation or growth of a dendrite of lithium and the rechargeable lithium battery exhibits a satisfactory battery performance. On the other hand, as for the rechargeable lithium battery obtained in Comparative Example 1, it was found that the rechargeable lithium battery is liable to cause the generation of a dendrite of lithium upon charging, and therefore, it is inferior in battery performance.

Independently, the rechargeable lithium battery obtained in Comparative Example 1 was compared with a commercially available rechargeable lithium battery having a carbon anode with respect to energy density. As a result, it was found that the energy density of the Comparative Example battery surpasses that of the commercially available battery by more than 50%.

Example 2

There was prepared a rechargeable lithium battery of the configuration shown in FIG. 3 in the same manner as in Example 1, except that the anode was formed in the following manner.

That is, there was provided a 50 μm thick aluminum foil as an anode collector. The aluminum foil was subjected to etching treatment using an aqueous solution containing 5 wt. % of potassium hydroxide to make it to have a roughened surface. The aluminum foil thus treated was washed with pure water, followed by drying.

A mixture composed of a powdery tungsten metal and a powdery molybdenum metal was reacted with an aqueous hydrogen peroxide solution to obtain a peroxo-polytungsten-molybdenum acid solution. The solution, isopropyl alcohol, polyvinylalcohol having a saponification value of 80%, azobisisobutyronitrile, and tetrafluoro lithium borate were mixed, to thereby obtain a coating liquid.

The resultant coating liquid was applied onto the roughened surface of the aluminum foil by means of a conventional spin coating process, to thereby form a coat on the roughened surface of the aluminum foil. The coat formed on the aluminum foil was dried, and subjected to heat treatment at 120° C. under reduced pressure, to form a 30 μm thick amorphous W-Mo oxide-polyvinylalcohol composite film on the roughened surface of the aluminum foil. Thus, there was obtained an anode.

Using the anode thus obtained, there was prepared a rechargeable lithium battery in the same manner as in Example 1. In this way, there were obtained two rechargeable lithium battery samples C1 and C2.

Evaluation

Using the rechargeable lithium battery sample C1, the state of lithium deposited on the anode surface was examined in the manner described in the foregoing evaluation (1). As a result, it was found that lithium is deposited on the anode surface such that granules of lithium are uniformly and substantially two-dimensionally grown without the generation of a dendrite of lithium.

Using the rechargeable lithium battery sample C2, evaluation was conducted with respect to battery characteristics through the charging and discharging cycle test in the manner described in the foregoing evaluation (2). The results obtained are shown in Table 1. Each of the values for Example 2 shown in Table 1 is a value relative to the corresponding value of Comparative Example 1, which is set at 1.

Further, as for the amorphous W-Mo oxide-polyvinylalcohol composite film of the anode, its electromotive force was examined in the manner described in the foregoing evaluation (3). As a result, the amorphous W-Mo oxide-polyvinyl alcohol composite film of the anode was found to have an electromotive force of less than 1.5 V.

From the evaluated results obtained in the above, it is understood that the rechargeable lithium battery obtained in this example has a prolonged charging and discharging cycle life and an excellent energy density which are greater than those of the rechargeable lithium battery obtained in Comparative Example 1.

In addition, it was found that the rechargeable lithium battery obtained in Example 2 always exhibits a satisfactory battery performance.

Example 3

There was prepared a rechargeable lithium battery of the configuration shown in FIG. 3 in the same manner as in Example 1, except that the anode was formed in the following manner.

That is, there was provided a 50 μm thick aluminum foil as an anode collector. The aluminum foil was subjected to etching treatment using an aqueous solution composed of phosphoric acid, nitric acid, acetic acid and water at a composition rate of 15:1:2:5 to make it to have a roughened surface. The aluminum foil thus treated was washed with pure water, followed by drying.

Separately, an aqueous solution of ammonium metavanadate and an aqueous solution of lithium tungstate were passed through a cation exchange resin to obtain a vanadium-tangstic acid solution, which was successively subjected to heat treatment at 40° C. for 24 hours, whereby a poly(vanadium-tungstic) acid solution was obtained. The resultant poly(vanadium-tungstic) acid solution was thoroughly mixed with isopropyl alcohol to obtain a coating liquid.

Then, the coating liquid was applied onto the roughened surface of the aluminum foil by means of a conventional dip coating process, to thereby form a coat on the roughened surface of the aluminum foil. The coat formed on the aluminum foil was dried, and subjected to heat treatment at 120° C. under reduced pressure, to form a 0.4 μm thick amorphous W-V oxide film on the roughened surface of the aluminum foil. Thus, there was obtained an anode.

Using the anode thus obtained, there was prepared a rechargeable lithium battery in the same manner as in Example 1. In this way, there were obtained two rechargeable lithium battery samples D1 and D2.

Evaluation

Using the rechargeable lithium battery sample D1, the state of lithium deposited on the anode surface was examined in the manner described in the foregoing evaluation (1). As a result, it was found that lithium is deposited such that granules of lithium are uniformly and substantially two-dimensionally grown without the generation of a dendrite of lithium.

Using the rechargeable lithium battery sample D2, evaluation was conducted with respect to battery characteristics through the charging and discharging cycle test in the manner described in the foregoing evaluation (2). The results obtained are shown in Table 1. Each of the values for Example 3 shown in Table 1 is a value relative to the corresponding value of Comparative Example 1, which is set at 1.

Further, as for the amorphous W-V oxide film of the anode, its electromotive force was examined in the manner described in the foregoing evaluation (3). As a result, the amorphous W-V oxide film of the anode was sound to have an electromotive force of less than 1.5 V.

From the evaluated results obtained in the above, it is understood that the rechargeable lithium battery obtained in Example 3 has a prolonged charging and discharging cycle life and an excellent energy density which are greater than those of the rechargeable lithium battery obtained in Comparative Example 1.

In addition, it was found that the rechargeable lithium battery obtained in Example 3 always exhibits a satisfactory battery performance.

Example 4

There was prepared a rechargeable lithium battery of the configuration shown in FIG. 3 in the same manner as in Example 1, except that the anode was formed in the following manner.

That is, there was provided a 55 μm thick laminate comprising a 25 μm thick lithium foil as an anode active material laminated on a 30 μm thick nickel mesh member as an anode collector. There was also provided a conventional sputtering apparatus having a deposition chamber.

The laminate was placed in the deposition chamber of the sputtering apparatus, followed by vacuuming the inside of the deposition chamber. Then, argon gas was introduced into the deposition chamber, and plasma was generated to etch the surface of the laminate foil of the laminated to roughen the surface of the lithium foil. Successively, a tungsten oxide target was sputtered with plasma generated from argon gas to cause the formation of a 50 nm thick amorphous tungsten oxide film on the roughened surface of the lithium foil of the laminate. Thus, there was obtained an anode.

Using the anode thus obtained, there was prepared a rechargeable lithium battery in the same manner as in Example 1. In this way, there were obtained two rechargeable lithium battery samples E1 and E2.

Evaluation

Using the rechargeable lithium battery sample E1, the state of lithium deposited on the anode surface was examined in the manner described in the foregoing evaluation (1). As a result, it was found that lithium is deposited on the anode surface such that granules of lithium are uniformly and substantially two-dimensionally grown without the generation of a dendrite of lithium.

Using the rechargeable lithium battery sample E2, evaluation was conducted with respect to battery characteristics through the charging and discharging cycle test in the manner described in the foregoing evaluation (2). The results obtained are shown in Table 1. Each of the values for Example 4 shown in Table 1 is a value relative to the corresponding value of Comparative Example 1, which is set at 1.

Further, as for the amorphous tungsten oxide film of the anode, its electromotive force was examined in the manner described in the foregoing evaluation (3). As a result, the amorphous tungsten oxide film of the anode was found to have an electromotive force of less than 1.0 V.

From the evaluated results obtained in the above, it is understood that the rechargeable lithium battery obtained in this example has a prolonged charging and discharging cycle life and an excellent energy density which are greater than those of the rechargeable lithium battery obtained in Comparative Example 1.

In addition, it was found that the rechargeable lithium battery obtained in Example 4 always exhibits a satisfactory battery performance.

Comparative Example 2

The procedures of Example 4 were repeated, except that in the formation of the anode, the formation of the amorphous tungsten oxide film was not conducted, to thereby obtain two rechargeable lithium battery samples.

Using one of the two rechargeable lithium battery samples, the state of lithium deposited on the anode surface was examined in the manner described in the foregoing evaluation (1). As a result, it was found to have a dendrite of lithium grown on the anode surface. And in the rechargeable lithium battery sample, it was found that such granules of lithium as found in Example 4 are not present.

The remaining rechargeable lithium battery sample was evaluated with respect to battery characteristics through the charging and discharging cycle test in the manner described in the foregoing evaluation (2). And the rechargeable lithium battery obtained in this comparative example was compared with the rechargeable lithium battery sample obtained in Example 4 with respect to their charging and discharging cycle life. As a result, it was found that the former is significantly inferior to the latter. Particularly, the charging and discharging cycle life of the latter was 4.8 times that of the former. From this, it was found that when an amorphous tungsten oxide film is disposed on the surface of an anode for a rechargeable lithium battery by means of the sputtering process makes the resulting rechargeable lithium battery have a remarkably prolonged charging and discharging cycle life.

Example 5

The procedures of Example 3 were repeated, except that the anode comprising the amorphous W-V oxide film formed on the roughened surface of the aluminum foil obtained in the formation of the anode was subjected to heat treatment at 400° C. to convert the amorphous W-V oxide film into a polycrystalline W-V oxide film, to thereby obtain two rechargeable lithium batteries F1 and F2.

Evaluation

Using the rechargeable lithium battery sample F1, the state of lithium deposited on the anode surface was examined in the manner described in the foregoing evaluation (1). As a result, it was found that lithium is deposited on the anode surface such that granules of lithium are uniformly and substantially two-dimensionally grown without the generation of a dendrite of lithium.

Using the rechargeable lithium battery sample F2, evaluation was conducted with respect to battery characteristics through the charging and discharging cycle test in the manner described in the foregoing evaluation (2). As a result, it was found that the rechargeable lithium battery sample is satisfactory with respect to battery characteristics.

Separately, the rechargeable lithium battery sample F2 was compared with the rechargeable lithium battery sample D2 obtained in Example 3 in terms of charging and discharging cycle life. As a result, it was found that the former is inferior to the latter. Particularly, the charging and discharging cycle life of the latter was 1.3 times that of the former. From this, it was found that as for the coating film disposed on the surface of an anode, an amorphous film is more effective than a polycrystalline film in order to attain a prolonged charging and discharging cycle life for a rechargeable lithium battery.

Further, as for the polycrystalline W-V oxide film of the anode in this example, its electromotive force was examined in the manner described in the foregoing evaluation (3). As a result, the polycrystalline W-V oxide film of the anode was found to have an electromotive force of less than 1.5 V.

In addition, it was found that the rechargeable lithium battery obtained in Example 5 exhibits a satisfactory battery performance.

Comparative Example 3

This comparative example is base on the foregoing Japanese Unexamined Patent Publication No. 283157/1994.

In this comparative example, there was prepared a rechargeable lithium battery of the configuration shown in FIG. 3 in the same manner as in Example 3, except that in the formation of the anode, the amorphous W—V oxide film was changed to a silica film.

Particularly, the rechargeable lithium battery was prepared in the same manner as in Example 1, except that the anode was formed in the following manner.

That is, there was provided a 50 μm thick aluminum foil as an anode collector. The aluminum foil was subjected to etching treatment using an aqueous solution composed of phosphoric acid, nitric acid, acetic acid and water at a composition rate of 15:1:2:5 to make it to have a roughened surface. The aluminum foil thus treated was washed with pure water, followed by drying.

Separately, tetraethoxysilane, ethanol, hydrochloric acid, and water were thoroughly mixed to obtain a colloidal silica. The resultant colloidal silica was thoroughly mixed with N,N-dimethyl formamide to obtain a colloidal silica coating liquid.

Then, the coating liquid was applied onto the roughened surface of the aluminum foil by means of a conventional dip coating process, to thereby form a coat on the roughened surface of the aluminum foil. The coat formed on the aluminum foil was dried, whereby forming a 0.4 μm thick silica film on the roughened surface of the aluminum foil. Thus, there was obtained an anode.

Using the anode thus obtained, there was prepared a rechargeable lithium battery in the same manner as in Example 1.

Evaluation

As for the silica film of the anode, its electromotive force was examined in the manner described in the foregoing evaluation (3). As a result, the silica film of the anode was found to have an electromotive force of more than 2.0 V.

And, as for the resultant rechargeable lithium battery, evaluation was conducted with respect to Coulomb efficiency and charging and discharging cycle life in a manner of conducting the charging and discharging cycle test described in the foregoing evaluation (2) under condition of 1 C (electric current of 1 time the electric capacity per an hour based on the electric capacity calculated from the cathode active material) for the charging and discharging and obtaining a Coulombic efficiency and a charging and discharging cycle life based on the results as a result of the charging and discharging cycle test.

The rechargeable lithium battery obtained in Example 3 was also evaluated with respect to Coulombic efficiency and charging and discharging cycle life in the same manner as in the above.

The Coulombic efficiency and charging and discharging cycle life obtained for the rechargeable lithium battery of Example 3 were compared with those obtained for the rechargeable lithium battery of Comparative Example 3, wherein the resultant values for Comparative Example 3 were set, respectively at 1. As a result, it was found that the Coulombic efficiency and the charging and discharging cycle life of the rechargeable lithium battery of Example 3 surpassed those of the rechargeable lithium battery of Comparative Example 3 by 1.3 times and 1.9 times, respectively.

From these evaluated results, it was found that the use of a specific metal oxide film as a coating material to cover the surface of an anode for a rechargeable lithium battery provides a desirable rechargeable lithium battery having satisfactory battery characteristics which are superior to those of a rechargeable battery having an anode covered by a conventional oxide film.

TABLE 1

|  | energy density | charging and discharging circle life |
| --- | --- | --- |
| Example 1 | 1.07 | 3.3 |
| Example 2 | 1.07 | 3.1 |
| Example 3 | 1.00 | 3.0 |
| Example 4 | 1.36 | 2.3 |

As apparent from the results obtained in the above examples, the following facts can be understood.

That is, according to the present invention, there can be attained a highly reliable, high performance rechargeable lithium battery in which lithium is deposited in a granular form in the anode generation or the generation or growth of a dendrite of lithium upon charging and which always exhibits an excellent battery performance while maintaining a high battery voltage and which has high energy density and a long charging and discharging cycle life. Particularly, the rechargeable lithium battery has an improved anode having a coat comprising a specific amorphous metal oxide material of 1.5 or less (preferably, 1.0 or less) in standard electrode potential difference or electromotive force with respect to lithium and capable of intercalating or deintercalating lithium ions generated during a battery reaction wherein said coat is disposed so as to cover the surface of the anode. The anode is structurally stable such that it is hardly deformed or cracked when expanded or shrunk due to the deposition or release of lithium upon repeating the charging and discharging cycle and the anode allows lithium to deposit in a granular form at the interfaces thereof upon charging without causing the generation or growth of a dendrite of lithium. In addition, the anode excels in resistance to chemicals.

Alternatively, the above coat may comprise a composite of the foregoing specific amorphous metal oxide material and an organic high molecular weight material such as fluororesin which is highly resistant to organic solvents, acids and alkalies, is insoluble to an electrolyte solution for a rechargeable lithium battery and has a water-repellency. In the anode having the coat comprising the composite disposed to cover the surface thereof, the coat is fixed to a base member as an anode collector with an improved adhesion. In this case, the above advantages of the anode are improved, wherein particularly, the structural stability of the anode is significantly improved.

The use of the anode having the above described advantages makes it possible to attain a highly reliable, high performance rechargeable lithium battery in which lithium is deposited in a granular form in the anode without causing the generation or growth of a dendrite of lithium upon operating the charging and which always exhibits an excellent battery performance while maintaining a high battery voltage and which has high energy density and a long charging and discharging cycle life.

What is claimed is:

1. A process for producing an anode for a rechargeable lithium battery, said process comprising the steps of:
   (a) providing an anode substrate and a solution of a polyacid; and
   (b) applying said polyacid solution onto a surface of said anode substrate to form a film of a metal oxide material so as to cover said surface of said anode substrate.

2. The process according to claim 1, wherein said polyacid contains at least an element selected from the group consisting of W, Mo, Ti, V, Nb, Zr, Hf, Ta and Cr.

3. The process according to claim 1, wherein said anode substrate contains an electrically conductive material.

4. The process according to claim 1, wherein said anode substrate contains an electrically conductive material and an anode active material.

5. The process according to claim 1, wherein said anode substrate contains at least an element selected from the group consisting of Al, Ti, Mg, Cu, Ni, Fe, Pt, Au, C and Li.

6. A process for producing an anode for a rechargeable lithium battery, said process comprising the steps of:
   (a) providing an anode substrate and a solution of a peroxo polyacid; and
   (b) applying said peroxo polyacid solution onto a surface of said anode substrate to form a film of a metal oxide material so as to cover said surface of said anode substrate.

7. The process according to claim 6, wherein said peroxo polyacid contains at least an element selected from the group consisting of W, Mo, Ti, V, Nb, Zr, Hf, Ta and Cr.

8. The process according to claim 6, wherein said anode substrate contains an electrically conductive material.

9. The process according to claim 6, wherein said anode substrate contains an electrically conductive material and an anode active material.

10. The process according to claim 6, wherein said anode substrate contains at least an element selected from the group consisting of Al, Ti, Mg, Cu, Ni, Fe, Pt, Au, C and Li.

11. A process for producing a rechargeable lithium battery comprising an anode, a separator, a cathode, an electrolyte or an electrolyte solution, and a housing, said process characterized by the inclusion of a step of forming said anode, said step of forming said anode comprising:
    (a) providing an anode substrate and a solution of a polyacid; and
    (b) applying said polyacid solution onto a surface of said anode substrate to form a film of a metal oxide material so as to cover said surface of said anode substrate.

12. The process according to claim 11, wherein said polyacid contains at least an element selected from the group consisting of W, Mo, Ti, V, Nb, Zr, Hf, Ta and Cr.

13. The process according to claim 11, wherein said anode substrate contains an electrically conductive material.

14. The process according to claim 11, wherein said anode substrate contains an electrically conductive material and an anode active material.

15. The process according to claim 11, wherein said anode substrate contains at least an element selected from the group consisting of Al, Ti, Mg, Cu, Ni, Fe, Pt, Au, C and Li.

16. A process for producing a rechargeable lithium battery comprising an anode, a separator, a cathode, an electrolyte or an electrolyte solution, and a housing, said process characterized by the inclusion of a step of forming said anode, said step of forming said anode comprising:
    (a) providing an anode substrate and a solution of a peroxo polyacid; and
    (b) applying said peroxo polyacid solution onto a surface of said anode substrate to form a film of a metal oxide material so as to cover said surface of said anode substrate.

17. The process according to claim 16, wherein said peroxo polyacid contains at least an element selected from the group consisting of W, Mo, Ti, V, Nb, Zr, Hf, Ta and Cr.

18. The process according to claim 16, wherein said anode substrate contains an electrically conductive material.

19. The process according to claim 16, wherein said anode substrate contains an electrically conductive material and an anode active material.

20. The process according to claim 16, wherein said anode substrate contains at least an element selected from the group consisting of Al, Ti, Mg, Cu, Ni, Fe, Pt, Au, C and Li.

* * * * *

UNITED STATES PATENT AND TRADEMARK OFFICE
CERTIFICATE OF CORRECTION

PATENT NO. : 6,063,142
DATED : May 16, 2000
INVENTOR(S) : SOICHIRO KAWAKAMI ET AL. Page 1 of 4

It is certified that error appears in the above-identified patent and that said Letters Patent is hereby corrected as shown below:

ON THE TITLE PAGE:

[56] References Cited, under FOREIGN PATENT DOCUMENTS

"5234585 9/1993 Japan" should be deleted;
"6283157 10/1994 Japan" should be deleted; and
"5190171" should read --5-190171--; and under OTHER PUBLICATIONS After "J. Solid State Chem.,""Jun. 5," should read
--Jun. 15,--.

COLUMN 1:

Line 21, "operating" should be deleted;
Line 42, "circumstance," should read
--circumstances,--; and
"made" should be deleted;
Line 45, "power" should read --power,--; and
Line 52, "substances" should read --substances,--.

COLUMN 2:

Line 5, "has" should read --have--;
Line 10, "charging" should read --charging,--;
Line 31, "anode" should read --anode,--; and
Line 40, "form" should read --forming--.

UNITED STATES PATENT AND TRADEMARK OFFICE
CERTIFICATE OF CORRECTION

PATENT NO.   : 6,063,142
DATED        : May 16, 2000
INVENTOR(S)  : SOICHIRO KAWAKAMI ET AL.

It is certified that error appears in the above-identified patent and that said Letters Patent is hereby corrected as shown below:

COLUMN 3:

Line 14, "aluminum-manganese" should read
        --aluminum-manganese alloy--;
    Line 34, "lithium" should read
        --a member made of lithium--; and
    Line 42, "become" should read --becomes--.

COLUMN 4:

Line 16, "inventors," should read --inventors--; and
    Line 21, "solved" should read --solved,--.

COLUMN 6:

Line 66, "in" (first occurrence) should be deleted.

COLUMN 7:

Line 32, "battery" (first occurrence) should be deleted and
    Line 42, "there" should be deleted.

COLUMN 10:

Line 50, "molecular" should read --molecular weight--; and
    Line 63, "are" should read --is--.

UNITED STATES PATENT AND TRADEMARK OFFICE
CERTIFICATE OF CORRECTION

PATENT NO. : 6,063,142
DATED : May 16, 2000
INVENTOR(S) : SOICHIRO KAWAKAMI ET AL.

It is certified that error appears in the above-identified patent and that said Letters Patent is hereby corrected as shown below:

COLUMN 13:

Line 51, "obtained." should read --formed.--;
Line 63, "polytangstic" should read --polytungstic--; and
Line 64, "polytangstic" should read --polytungstic--.

COLUMN 14:

Line 64, "for" should be deleted.

COLUMN 15:

Line 11, "includes" should read --include--.

COLUMN 16:

Line 10, "is" should read --are--.

COLUMN 17:

Line 30, "matters" should read --matter--; and
Line 35, "it absorbs" should read --they absorb--.

COLUMN 19:

Line 18, "The" should read --This--.

UNITED STATES PATENT AND TRADEMARK OFFICE
CERTIFICATE OF CORRECTION

PATENT NO.    : 6,063,142
DATED         : May 16, 2000
INVENTOR(S)   : SOICHIRO KAWAKAMI ET AL.

It is certified that error appears in the above-identified patent and that said Letters Patent is hereby corrected as shown below:

COLUMN 21:

Line 7, "excess" should read --excess of--.

COLUMN 22:

Line 62, "vanadium-tangstic" should read --vanadium-tungstic--.

COLUMN 23:

Line 33, "sound" should read --found--.

Signed and Sealed this

Twenty-second Day of May, 2001

Attest:

NICHOLAS P. GODICI

*Attesting Officer*    *Acting Director of the United States Patent and Trademark Office*